(12) United States Patent
Mak (10) Patent No.: US 10,776,682 B2
(45) Date of Patent: Sep. 15, 2020

(54) SWITCHABLE RFID TAG AND A METHOD FOR OPERATING A SWITCHABLE RFID CIRCUIT

(71) Applicant: Hong Kong R&D Centre for Logistics and Supply Chain Management Enabling Technologies Limited, Pok Fu Lam (HK)

(72) Inventor: Chi Lun Mak, Pok Fu Lam (HK)

(73) Assignee: Hong Kong R&D Centre for Logistics and Supply Chain Management Enabling Technologies Limited, PokFu Lam (HK)

( * ) Notice: Subject to any disclaimer, the term of this patent is extended or adjusted under 35 U.S.C. 154(b) by 0 days.

(21) Appl. No.: 16/474,739

(22) PCT Filed: Dec. 30, 2016

(86) PCT No.: PCT/CN2016/113547
§ 371 (c)(1),
(2) Date: Jun. 28, 2019

(87) PCT Pub. No.: WO2018/120037
PCT Pub. Date: Jul. 5, 2018

(65) Prior Publication Data
US 2019/0318215 A1  Oct. 17, 2019

(51) Int. Cl.
*G06K 19/073* (2006.01)
*G06K 19/077* (2006.01)

(52) U.S. Cl.
CPC . *G06K 19/07345* (2013.01); *G06K 19/07773* (2013.01)

(58) Field of Classification Search
None
See application file for complete search history.

(56) References Cited

U.S. PATENT DOCUMENTS

| | | | |
|---|---|---|---|
| 2012/0280044 A1* | 11/2012 | Mullis | H01Q 1/2225 235/492 |
| 2013/0238405 A1 | 9/2013 | Roesner | |
| 2014/0062827 A1 | 3/2014 | Kato | |

FOREIGN PATENT DOCUMENTS

| CN | 101398911 | 4/2009 |
|---|---|---|
| CN | 103955732 | 7/2014 |

\* cited by examiner

*Primary Examiner* — Kristy A Haupt
(74) *Attorney, Agent, or Firm* — Renner, Kenner, Grieve, Bobak, Taylor & Weber (57) ABSTRACT

A switchable RFID tag comprising at least one RFID code circuit disposed on an adjustable member being adjacent to an antenna; wherein the adjustable member is arranged to be manipulated to move the at least one RFID code circuit into a communication position whereby the RFID code circuit is coupled to the antenna; and into an inactive position whereby the RFID code circuit is uncoupled from the antenna.

20 Claims, 11 Drawing Sheets

SWITCHABLE RFID TAG AND A METHOD FOR OPERATING A SWITCHABLE RFID CIRCUIT

TECHNICAL FIELD

The present invention relates to a switchable RFID tag and a method for operating a switchable RFID circuit and more particularly, although not exclusively, to a switchable RFID tag and a method for operating a switchable RFID circuit, wherein the RFID code circuit is movable between a communication position and an inactive position.

BACKGROUND

The investments in motorway networks and specific road infrastructure constructions such as bridges and tunnels hit billion dollars. In most countries, tolls such as toll roads, toll bridges and toll tunnels are often set aside by the public authorities primarily for revenue generation, for example, to repay for the long-term debt issued to finance the construction investments, the operations and maintenances of the road facilities or the toll facilities, to finance capacity expansions, or simply applied as general tax funds for the local government bodies.

To collect the tolls from the road users, the vehicles are required to stop or slow down upon approaching the toll facilities, and the road users may settle the toll payment by hand at the tollgates. Whilst electronic toll collection systems are readily deployed at the toll barriers, the performance of such automatic system, such as the radio communications between the multi-RFID tags owned by the toll payers and the RFID readers at the toll collecting points remains unsatisfactory.

SUMMARY OF THE INVENTION

Without wishing to be bound by theory, the inventors, through their own research via trials and experimentation, have discovered that existing toll payment facilities may not fulfil the daily transportation needs. For instance, the switchable RFID tags are generally bulky and the switching process may be prone to errors. Accordingly, it would be inefficient and slow to switch the RFID tags to deliver the desirable Electronic Product Code (EPC), and at worst, the reader may read the undesired EPC of the switchable RFID tags unintentionally if the tag is switched during driving and meanwhile the vehicle is crossing the payment system.

To solve or alleviate at least some of the above problems, the present invention discloses a switchable RFID tag and a method for operating a switchable RFID circuit.

In one example embodiment, the switchable RFID tag allow drivers to select an appropriate RFID code, so that they can legally travel via the high-occupancy vehicle lane or express lane, which is a restricted traffic lane reserved at particular time slot, e.g. at peak travel times for exclusive use of vehicles with a driver and one or more passengers.

Advantageously, the present invention provide a switchable RFID tag with a lower profile and smaller size, and a novel rotating mechanism for the switching of RFID codes (e.g. selection of RFID codes includes Solo Driver, 2 person carpool, 3 person or above carpool usually set before driving).

The switchable RFID tag may comprise at least one RFID code circuit disposed on an adjustable member being adjacent to an antenna. The adjustable member is arranged to be manipulated to move the at least one RFID code circuit into a communication position whereby the RFID code circuit is coupled to the antenna and meanwhile, move the at least one RFID code circuit into an inactive position whereby the RFID code circuit is uncoupled from the antenna.

In accordance with a first aspect of the present invention, there is provided a switchable RFID tag comprising at least one RFID code circuit disposed on an adjustable member being adjacent to an antenna; wherein the adjustable member is arranged to be manipulated to move the at least one RFID code circuit into a communication position whereby the RFID code circuit is coupled to the antenna; and into an inactive position whereby the RFID code circuit is uncoupled from the antenna.

In one embodiment of the first aspect, the adjustable member is a tag plate arranged to be rotated so as to move the at least one RFID code circuit into a communication position and into an inactive position.

In one embodiment of the first aspect, further comprising at least one shield arranged to shield the at least one RFID code circuit from radio communications.

In one embodiment of the first aspect, further comprising at least one shielding pad arranged to shield the at least one RFID code circuit from radio communications.

In one embodiment of the first aspect, wherein the at least one shield is positioned so as to shield the at least one RFID code circuit from radio communications when the at least one RFID code circuit is in the inactive position.

In one embodiment of the first aspect, wherein the at least one RFID code circuit is placed onto a portion of the tag plate between a rotational axis of the circular arrangement and an edge of the tag plate.

In one embodiment of the first aspect, wherein the communication position is when the portion of the tag plate with the at least one RFID code circuit desired to be activated is rotated to an antenna coupling position of the antenna, arranged to form a physical or non-physical connection between the at least one RFID code circuit on the portion of the tag plate and the antenna.

In one embodiment of the first aspect, wherein the connection between the antenna and the at least one RFID code circuit on the portion of the circular arrangement in the communication position is capacitive.

In one embodiment of the first aspect, wherein the antenna extends opposingly from the antenna coupling to substantially form a tangent with the circular arrangement.

In one embodiment of the first aspect, wherein the tag plate has a plurality of RFID code circuits placed thereon, with each one of the plurality of RFID code circuits being arranged to be rotated into a communication position whilst the remaining RFID code circuits are in an inactive position.

In one embodiment of the first aspect, wherein the tag plate is arranged to be manipulated such that the RFID code circuit being in a communication position can be rotated into an inactive position, with an adjacent RFID code circuit being rotated from an inactive position into a communication position.

In one embodiment of the first aspect, further comprising a window arranged to partially reveal the at least one RFID code circuit or the adjustable member positioned at the communication position.

In one embodiment of the first aspect, wherein the at least one RFID code circuit or the adjustable member is provided a visual indicator.

In accordance with a second aspect of the present invention, there is provided a method for operating a switchable RFID circuit comprising the steps of: manipulating a tag plate having a plurality of RFID tags thereon between a communication position and an inactive position, wherein in the communication position, at least one of the plurality of RFID tags is arranged to couple with an antenna for communication, whilst the remaining RFID tags are shielded from the antenna.

In one embodiment of the second aspect, wherein the step of manipulating the tag plate further comprises the step of rotating the tag plate so as to move the at least one of the plurality of RFID tags into a communication position and into an inactive position.

In one embodiment of the second aspect, wherein the step of manipulating the tag plate includes shielding the remaining RFID tags from radio communications by at least one shield.

In one embodiment of the second aspect, wherein the at least one shield is positioned so as to shield the remaining RFID tags from radio communications when the remaining RFID tags are in the inactive position.

In one embodiment of the second aspect, wherein the plurality of RFID tags are placed onto a portion of the tag plate between a rotational axis of the circular arrangement and an edge of the tag plate.

In one embodiment of the second aspect, wherein the communication position is when the portion of the tag plate with the at least one of the plurality of RFID tags desired to be activated is rotated to an antenna coupling of the antenna, arranged to form a connection between the at least one of the plurality of RFID tags on the portion of the tag plate and the antenna.

In one embodiment of the second aspect, wherein the connection between the antenna and the at least one of the plurality of RFID tags on the portion of the circular arrangement in the communication position is capacitive.

In one embodiment of the second aspect, wherein the antenna extends opposingly from the antenna coupling to substantially form a tangent with the circular arrangement.

In one embodiment of the second aspect, wherein each one of the plurality of RFID tags being arranged to be rotated into a communication position whilst the remaining RFID tags are in an inactive position.

In one embodiment of the second aspect, wherein the tag plate is arranged to be manipulated such that the RFID tag being in a communication position can be rotated into an inactive position, with an adjacent RFID tag being rotated from an inactive position into a communication position.

In one embodiment of the second aspect, wherein the switchable RFID circuit further comprising a window arranged to partially reveal the at least one of the plurality of RFID tags or the tag plate positioned at the communication position.

In one embodiment of the second aspect, wherein the at least one of the plurality of RFID tags or the tag plate is provided a visual indicator.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1A:
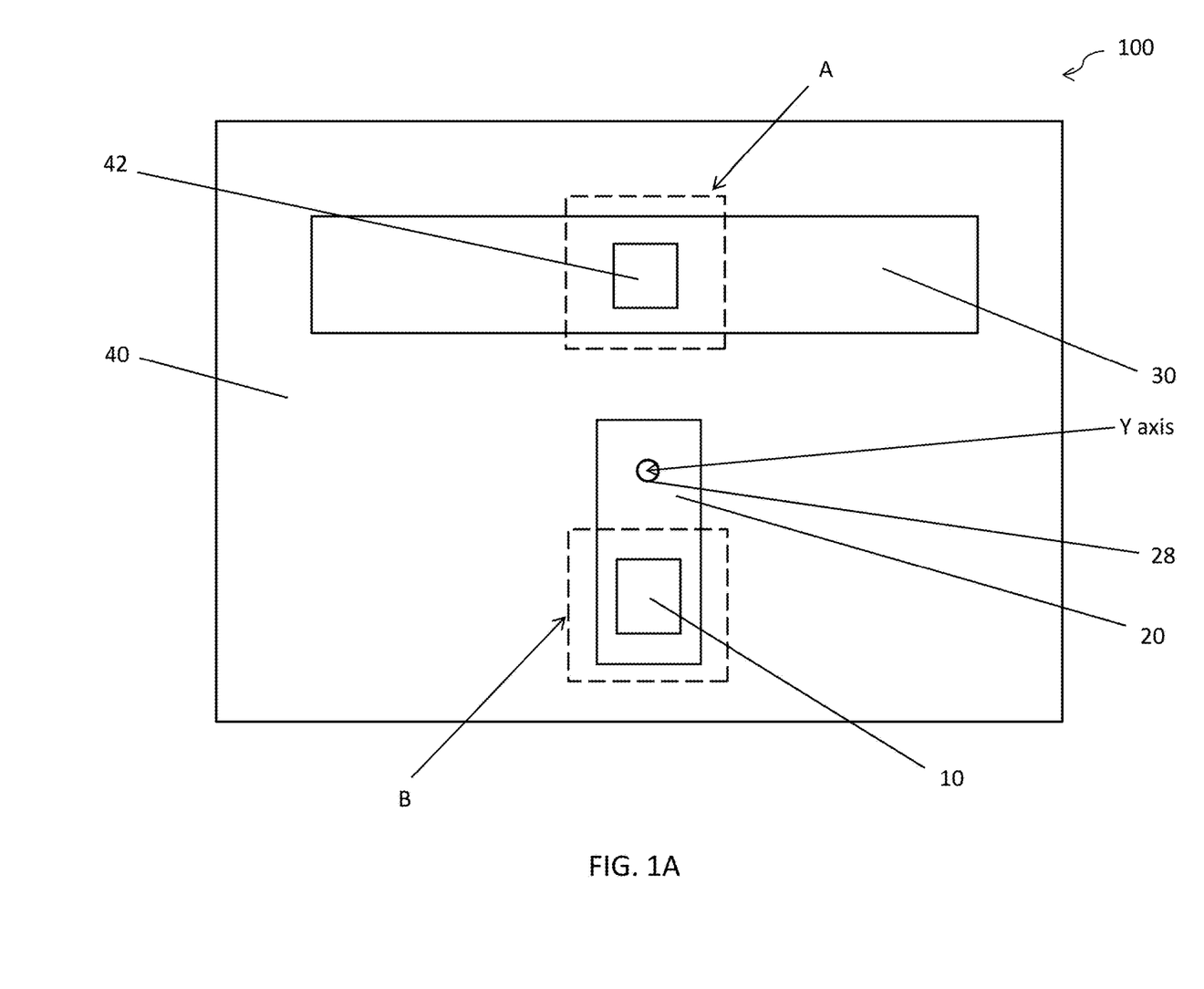
FIG. 1A shows a schematic front view of a switchable RFID tag in accordance with one embodiment of the present invention.
Figure 1B:
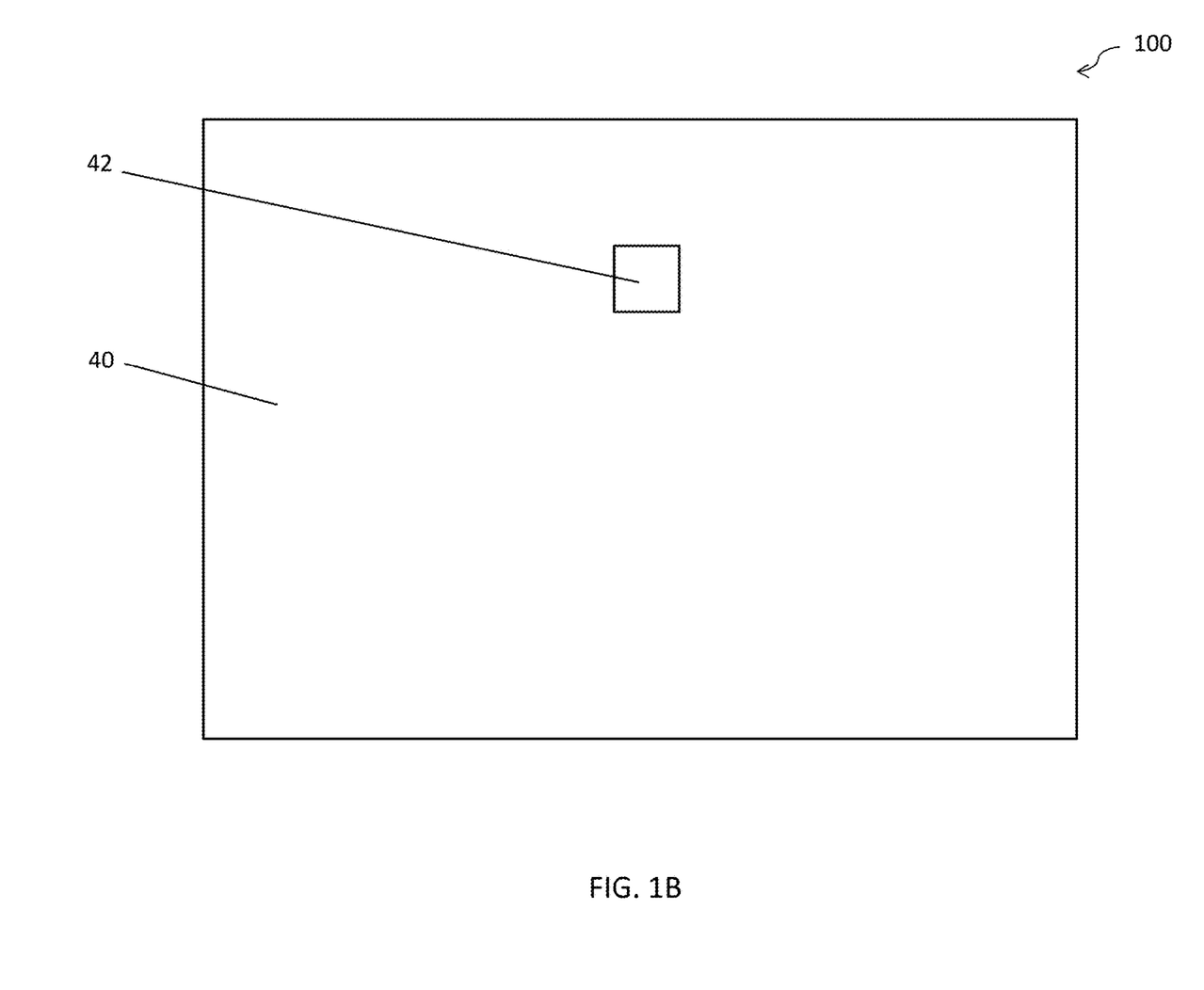
FIG. 1B shows a schematic rear view of a switchable RFID tag in accordance with one embodiment of the present invention.

With reference initially to FIGS. 1A to 1B, there is provided a switchable RFID tag 100 comprising at least one RFID code circuit 10 disposed on an adjustable member 20 being adjacent to an antenna 30; wherein the adjustable member 20 is arranged to be manipulated to move the at least one RFID code circuit 10 into a communication position A whereby the RFID code circuit 10 is coupled to the antenna 30; and into an inactive position B whereby the RFID code circuit 10 is uncoupled from the antenna 30.

In this embodiment, the switchable RFID tag 100 includes a RFID code circuit 10, an adjustable member 20 for receiving the RFID code circuit 10, an antenna 30 and a housing 40. The adjustable member 20, e.g. a tag plate 20 may be preferably pivoted to the housing 40 through a coupling means 28 e.g. screws, such that the adjustable member 20 may rotate freely about the rotation axis Y to move the RFID code circuit 10 into a communication position A, thereby coupling to the antenna 30, or alternatively, move the RFID code circuit 10 away from the communication position A, i.e. into an inactive position B, thereby uncoupling from the antenna 30.

Optionally, the housing 40 may be further provided a window 42 within the communication position A and adjacent to the antenna 30, such that the user may observe whether the RFID code circuit 10 is coupled to the antenna 30 and read the indicator on the rear portion of the adjustable member 20 through the window 42. Alternatively, the window 42 may be provided adjacent to the communication position A or any positions within the housing 40, thereby allowing the user to observe the position of the RFID code circuit 10, or retrieve any information or indications associated with the position of the RFID code circuit 10.

Figure 2:
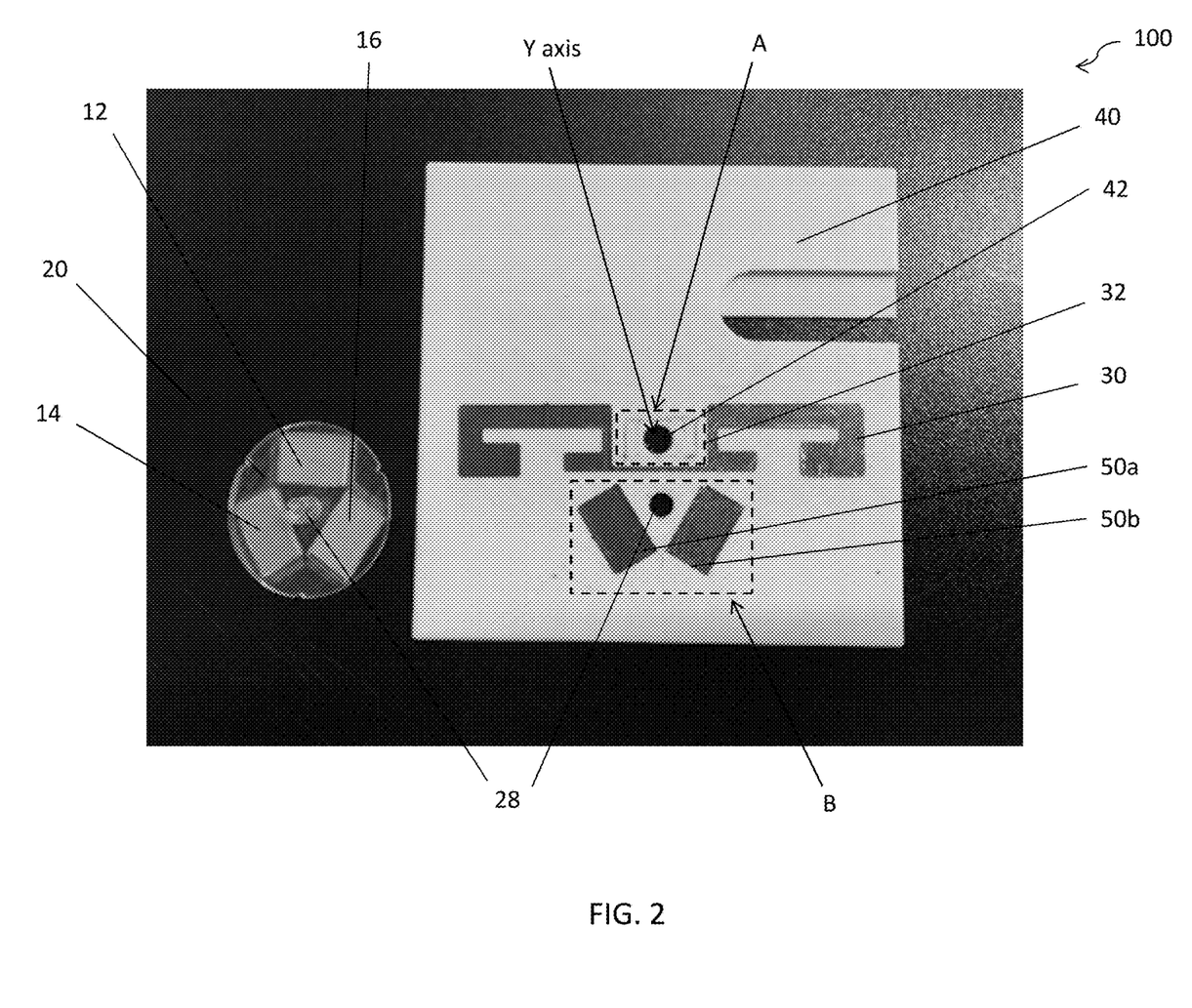
FIG. 2 is an explosive diagram showing the components of the switchable RFID tag in details.

With reference to FIG. 2, there is provided a switchable RFID tag 100 comprising a plurality of RFID code circuits 10, an adjustable member 20, an antenna 30 and a housing 40. For instance, the plurality of RFID code circuits 10 may further include a first RFID code circuit 12, a second RFID code circuit 14, and a third RFID code circuit 16, and the adjustable member 20 may be preferably a circular tag plate 20 pivoted to the housing 40 through a coupling means 28.

Preferably, the RFID code circuits 12, 14, 16 may be placed onto a portion of the tag plate 20 between a rotational axis Y of the circular arrangement and an edge of the tag plate 20. For instance, the direction of the rotational axis Y may be perpendicular to the two dimensional surface represented upon FIG. 2, i.e. out of the plane or alternatively entering into the plane. The antenna 30 may further provide an antenna coupling 32 in its substantial middle portion for receiving one of the RFID code circuits 12/14/16, and the two ends of the booster antenna 30 may further extend opposingly from the central antenna coupling 32 to substantially form a tangent with the circular arrangement of the circular tag plate 20.

In this embodiment, the switchable RFID tag 100 may provide the RFID code circuits 12, 14, 16 a communication position A and an inactive position B within the housing 40. Preferably, the communication position A is a position where the portion of the tag plate 20 with one of the RFID code circuits 12/14/16 desired to be activated is rotated to an antenna coupling 32 of the antenna 30, thereby forming a capacitive connection between the RFID code circuit 12/14/16 to be activated and the antenna 30.

Meanwhile, the inactive position B may be an alternative position where the portion of the tag plate 20 with the rest of the RFID code circuits 12/14/16 undesired to be activated is rotated away from the antenna coupling 32, thereby avoiding any capacitive connections between these RFID code circuits 12/14/16 and the antenna 30. Advantageously, only one of the RFID code circuits 12/14/16 would position within the communication position A, while the rest of RFID code circuits 12/14/16 would position within inactive position B simultaneously.

Optionally, the switchable RFID tag 100 may further include a plurality of shields 50a and 50b e.g. shielding pads positioned within the inactive position B, in order to shield the RFID code circuits 12/14/16 desired to be deactivated from any radio communications when these RFID code circuits 12/14/16 are within the inactive position B. For instance, when the RFID code circuit 12 is in the communication position A, the RFID code circuits 14, 16 may be shielded by the shields 50a and 50b. This ensures that only the desired EPC of the RFID code circuit 12 is read by a RFID reader, while the other two RFID code circuits 14, 16 are being shielded effectively.

With reference to FIGS. 3A to 3C or FIGS. 5A to 5B, there is provided a switchable RFID tag 100 comprising a plurality of RFID code circuits 10, an adjustable member 20, an antenna 30 and a housing 40. Preferably, the tag plate 20 has a plurality of RFID code circuits 12, 14, 16 placed thereon, with one of the plurality of RFID code circuits 12, 14, 16 being arranged to be rotated into a communication position A whilst the remaining RFID code circuits 12, 14, 16 are in an inactive position B and shielded by shields 50a and 50b.

Figure 3A:
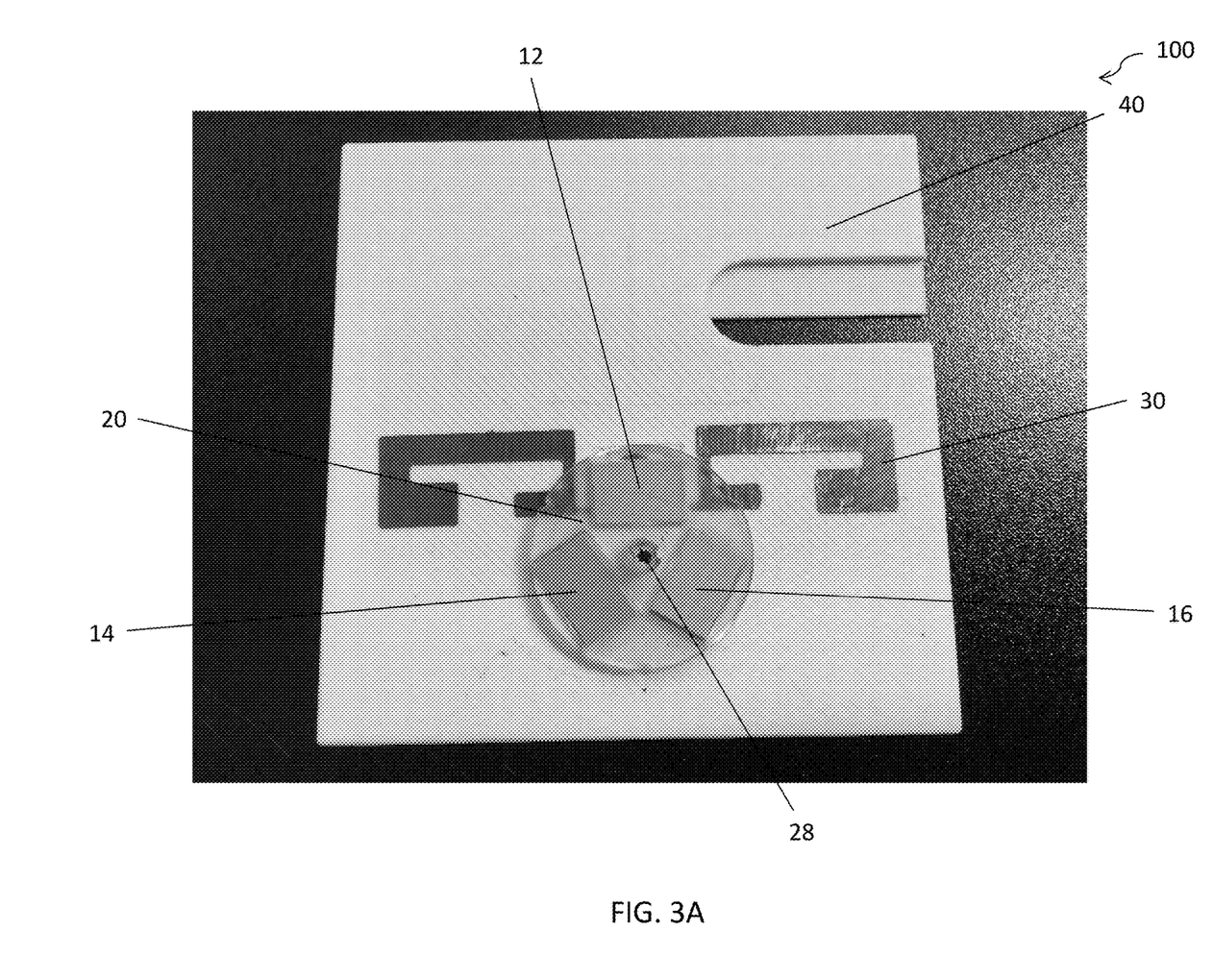
FIG. 3A shows the switchable RFID tag in FIG. 2 with the first RFID code circuit in a communication position and the second and third RFID code circuits in an inactive position.
Figure 5A:
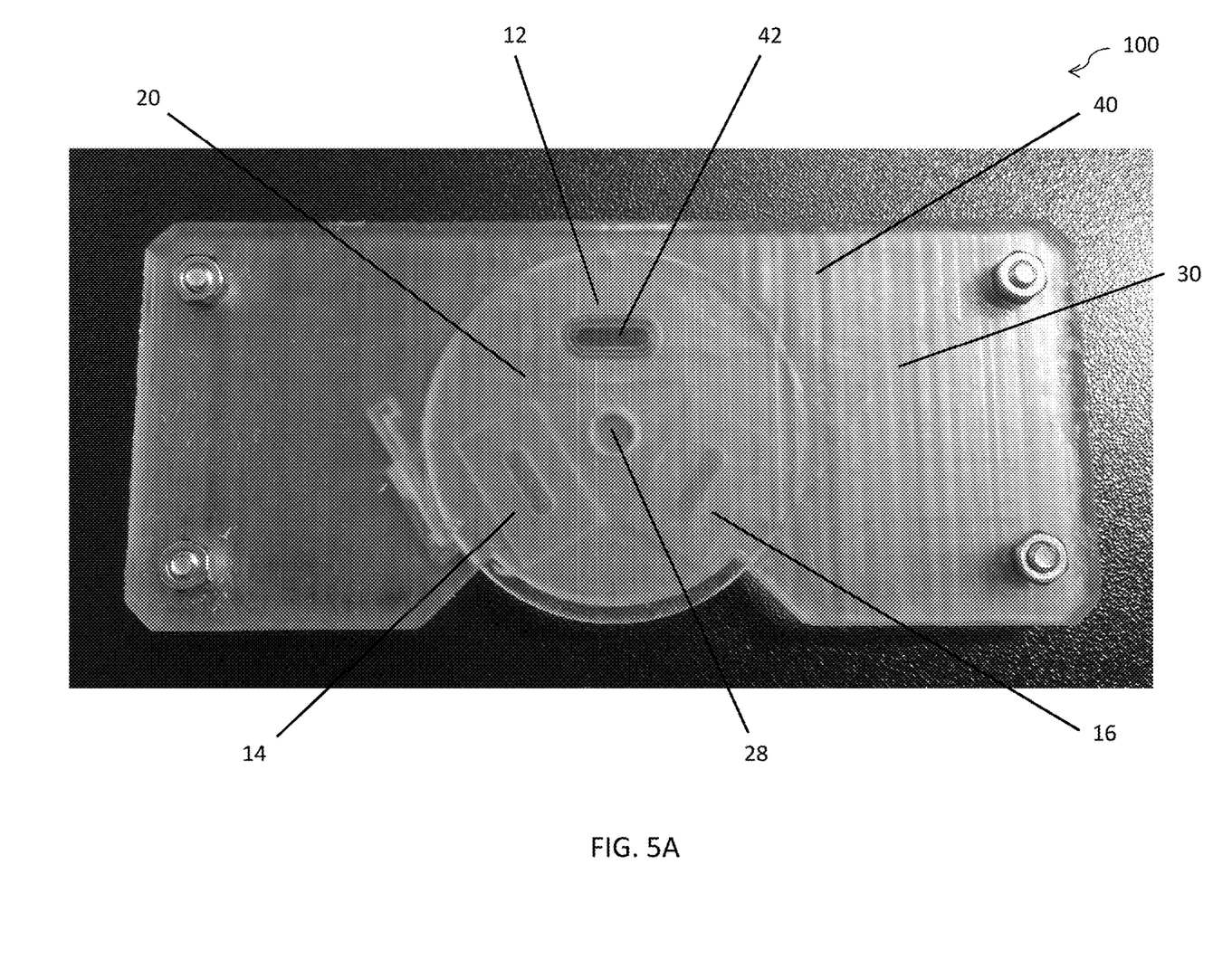
FIG. 5A shows a front view of a switchable RFID tag in accordance with one embodiment of the present invention, with the first RFID code circuit in a communication position and the second and third RFID code circuits in an inactive position.
Figure 5B:
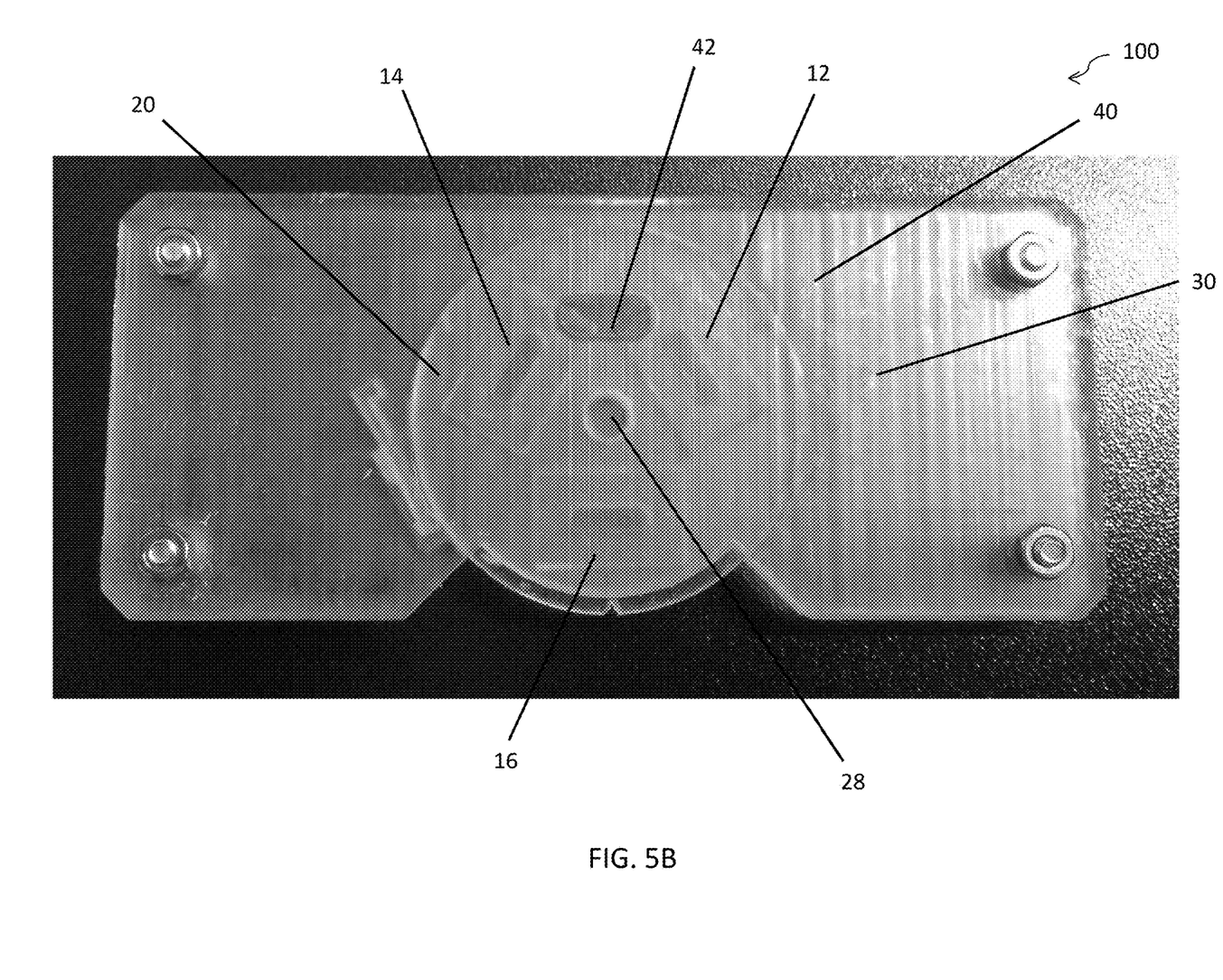
FIG. 5B shows the interval when the switchable RFID tag in FIG. 5A is switching clockwise from the first RFID code circuit to the second RFID code circuit or switching anti-clockwise from the second RFID code circuit to the first RFID code circuit, with the third RFID code circuit remains in an inactive position.

In this embodiment, the RFID code circuit 12 may be initially rotated into a communication position A and coupled to the antenna 30 through the antenna coupling 32, whilst the remaining RFID code circuits 14, 16 are shielded by the shields 50a and 50b in an inactive position B, as shown in FIG. 3A or FIG. 5A.

Figure 3B:
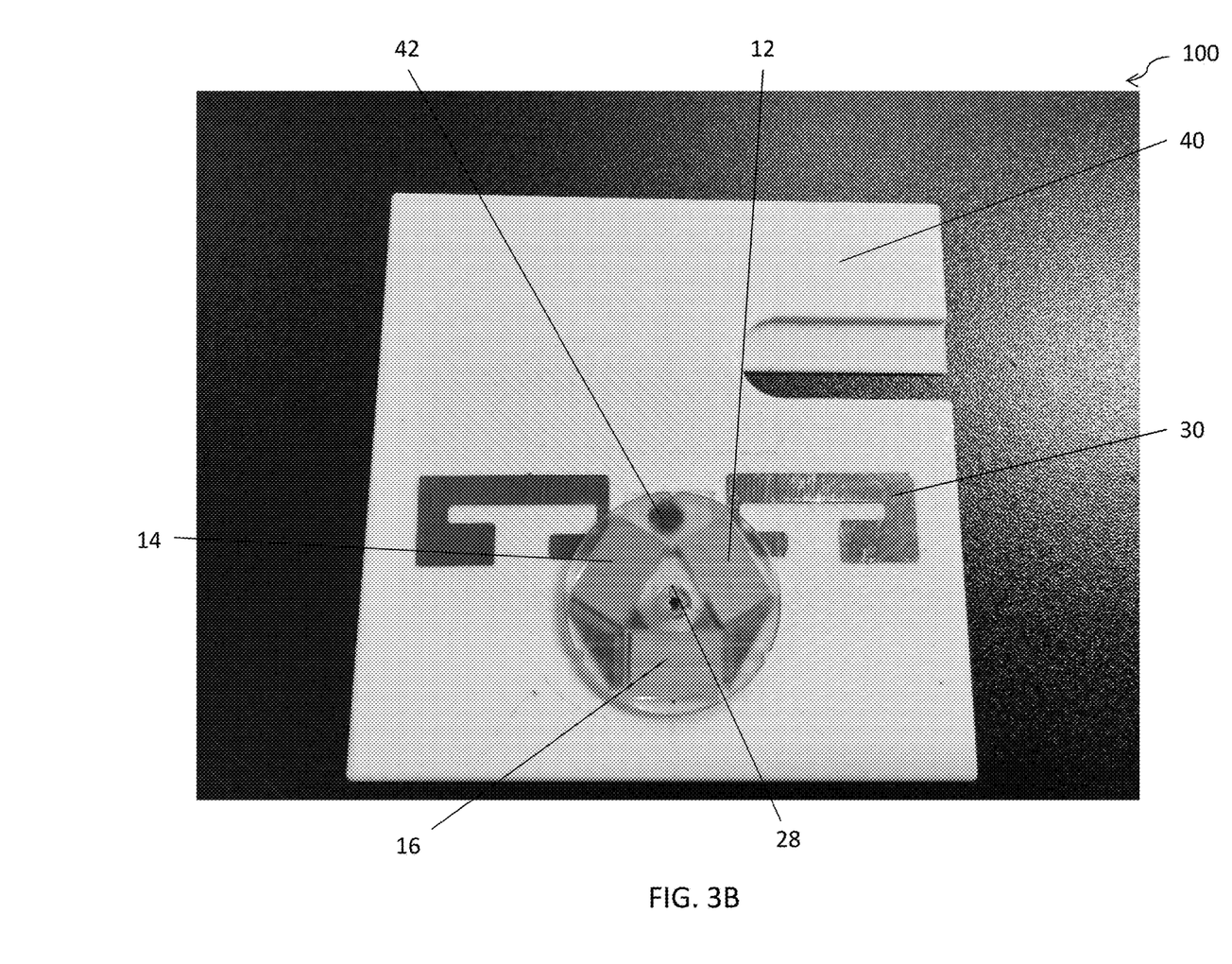
FIG. 3B shows the interval when the switchable RFID tag in FIG. 2 is switching clockwise from the first RFID code circuit to the second RFID code circuit or switching anti-clockwise from the second RFID code circuit to the first RFID code circuit, with the third RFID code circuit remains in an inactive position.
Figure 3C:
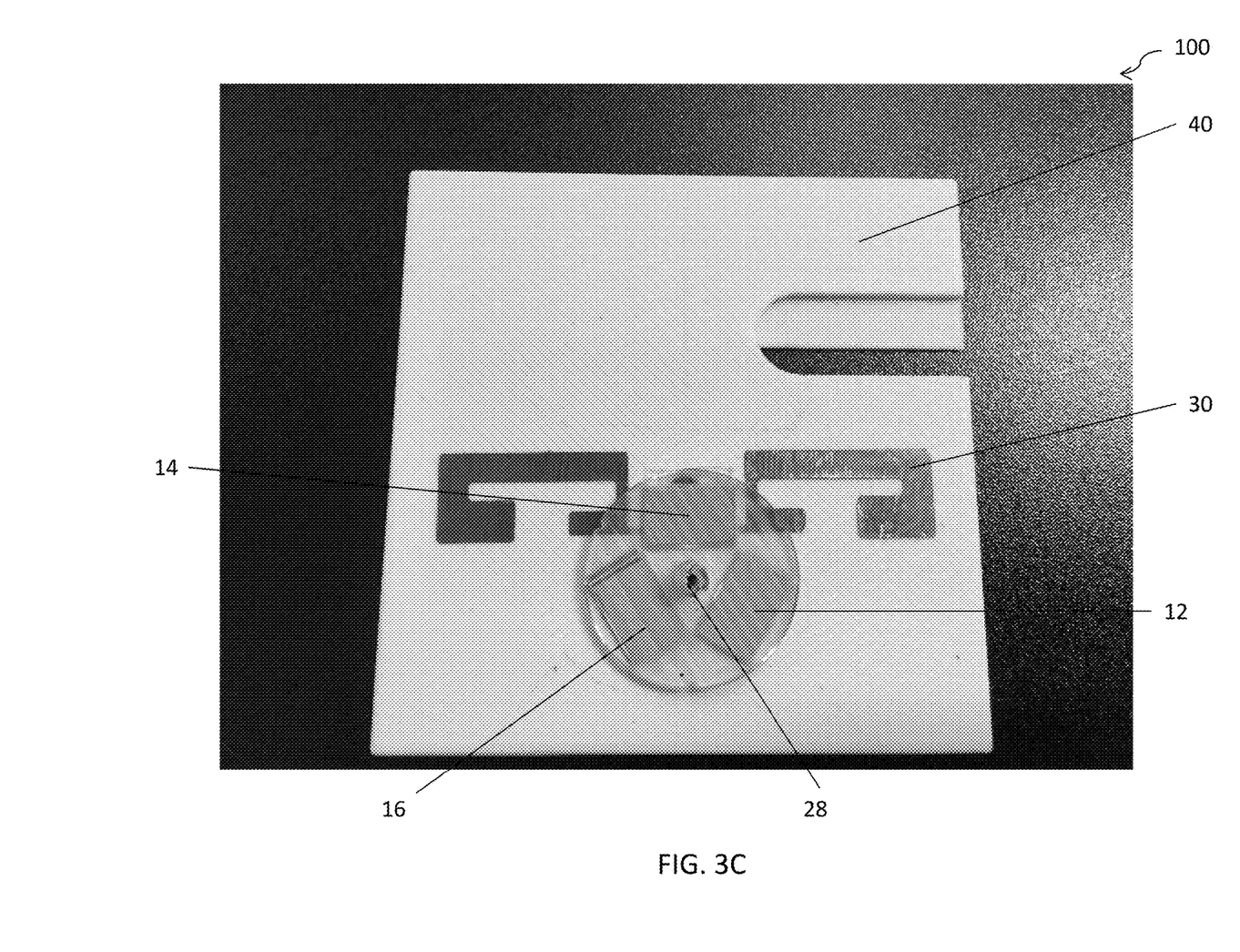
FIG. 3C shows the switchable RFID tag in FIG. 2 with the second RFID code circuit in communication position and the first and third RFID code circuits in an inactive position.

The tag plate 20 may be manipulated by the user through a clockwise direction, such that e.g. the RFID code circuit 12 being in a communication position A can be rotated into an inactive position B, with an adjacent RFID code circuit 14 being rotated from an inactive position B into a communication position A, as shown in FIG. 3C. The RFID code circuit 12 is thus replaced by the RFID code circuit 14 within the communication position A through a first rotation of the tag plate 20, such that the RFID code circuit 14 is now coupled to the antenna 30 through the antenna coupling 32. Advantageously, the RFID code circuit 16 stays within the inactive position B and has no chance to pass by the communication position A.

Preferably, the tag plate 20 may be rotated further clockwise, such that RFID code circuit 14 being in a communication position A can be rotated into an inactive position B, with an adjacent RFID code circuit 16 being rotated from an inactive position B into a communication position A. The RFID code circuit 14 is thus replaced by the RFID code circuit 16 within the communication position A through a second rotation of the tag plate 20, such that the RFID code circuit 16 is now coupled to the antenna 30 through the antenna coupling 32. Advantageously, the RFID code circuit 12 stays within the inactive position B and has no chance to pass by the communication position A.

The tag plate 20 may be rotated clockwise again by the user, such that RFID code circuit 16 being in a communication position A can be rotated into an inactive position B, with an adjacent RFID code circuit 12 being rotated from an inactive position B into a communication position A. The RFID code circuit 16 is thus replaced by the RFID code circuit 12 within the communication position A through a third rotation of the tag plate 20, such that the RFID code circuit 12 is now coupled to the antenna 30 again through the antenna coupling 32, as shown in FIG. 3A or FIG. 5A. Advantageously, the RFID code circuit 14 stays within the inactive position B and has no chance to pass by the communication position A.

Alternatively, the tag plate 20 may be manipulated by the user through an anti-clockwise direction, such that e.g. the RFID code circuit 12 being in a communication position A can be rotated into an inactive position B, with the other adjacent RFID code circuit 16 being rotated from an inactive position B into a communication position A. The RFID code circuit 12 is thus replaced by the RFID code circuit 16 within the communication position A through a first rotation of the tag plate 20, such that the RFID code circuit 16 is now coupled to the antenna 30 through the antenna coupling 32. Advantageously, the RFID code circuit 14 stays within the inactive position B and has no chance to pass by the communication position A.

Preferably, the tag plate 20 may be rotated further anti-clockwise, such that RFID code circuit 16 being in a communication position A can be rotated into an inactive position B, with an adjacent RFID code circuit 14 being rotated from an inactive position B into a communication position A. The RFID code circuit 16 is thus replaced by the RFID code circuit 14 within the communication position A through a second rotation of the tag plate 20, such that the RFID code circuit 14 is now coupled to the antenna 30 through the antenna coupling 32. Advantageously, the RFID code circuit 12 stays within the inactive position B and has no chance to pass by the communication position A.

The tag plate 20 may be rotated anticlockwise again by the user, such that RFID code circuit 14 being in a communication position A can be rotated into an inactive position B, with an adjacent RFID code circuit 12 being rotated from an inactive position B into a communication position A. The RFID code circuit 14 is thus replaced by the RFID code circuit 12 within the communication position A through a third rotation of the tag plate 20, such that the RFID code circuit 12 is now coupled to the antenna 30 again through the antenna coupling 32. Advantageously, the RFID code circuit 16 stays within the inactive position B and has no chance to pass by the communication position A.

Figure 4A:
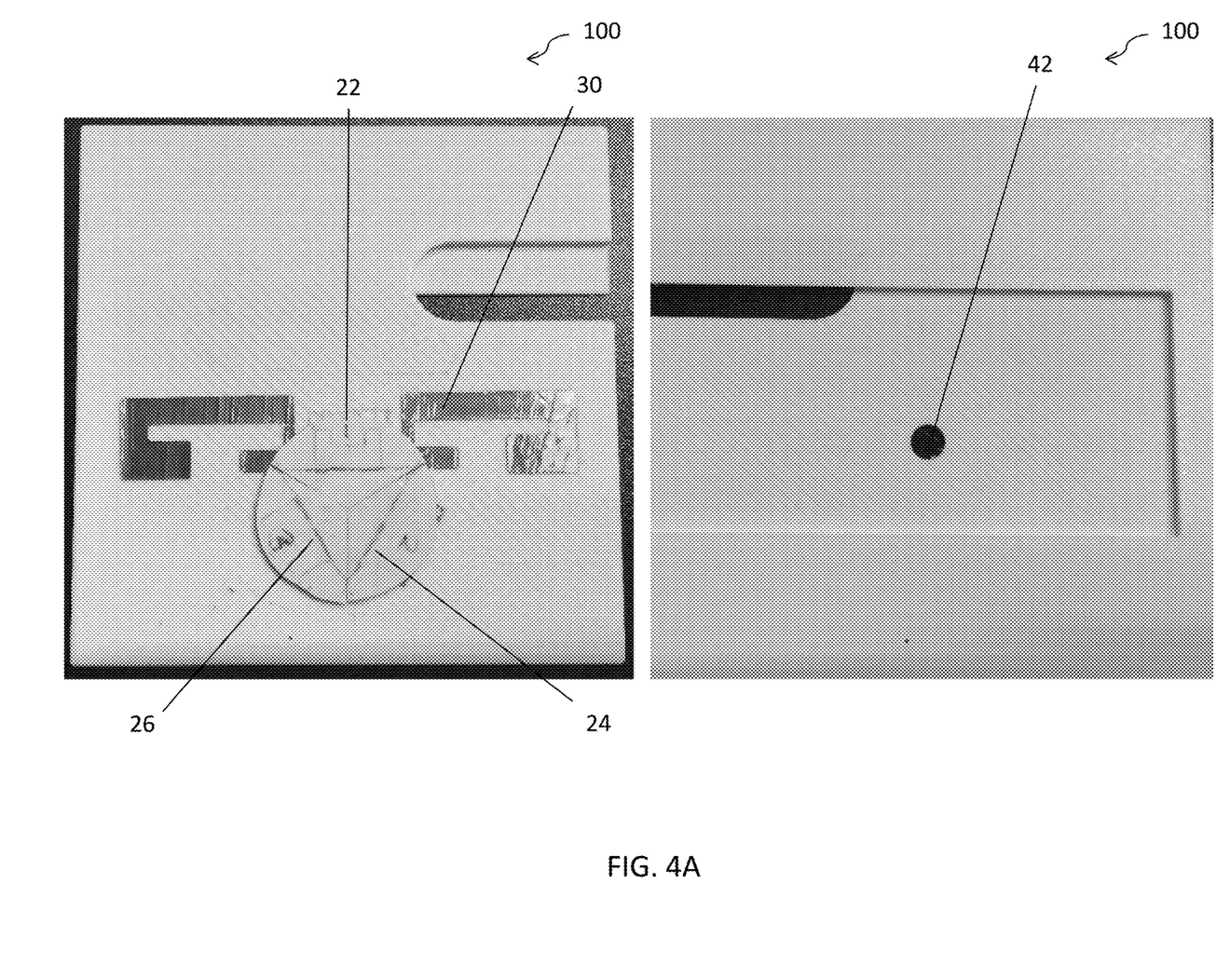
FIG. 4A shows a front and rear view of a switchable RFID tag with a first RFID code circuit in a communication position.
Figure 4B:
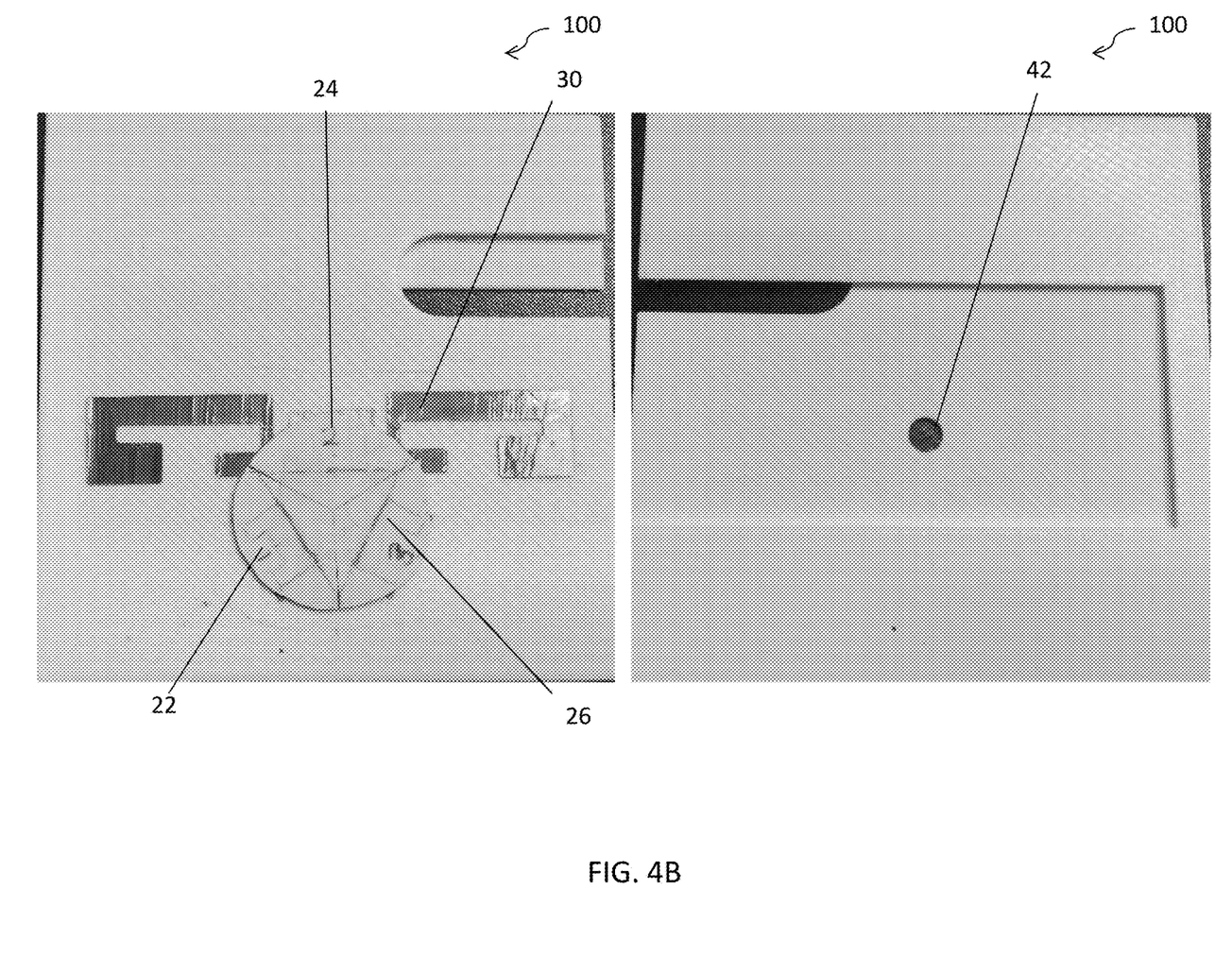
FIG. 4B shows a front and rear view of a switchable RFID tag with a second RFID code circuit in a communication position.
Figure 4C:
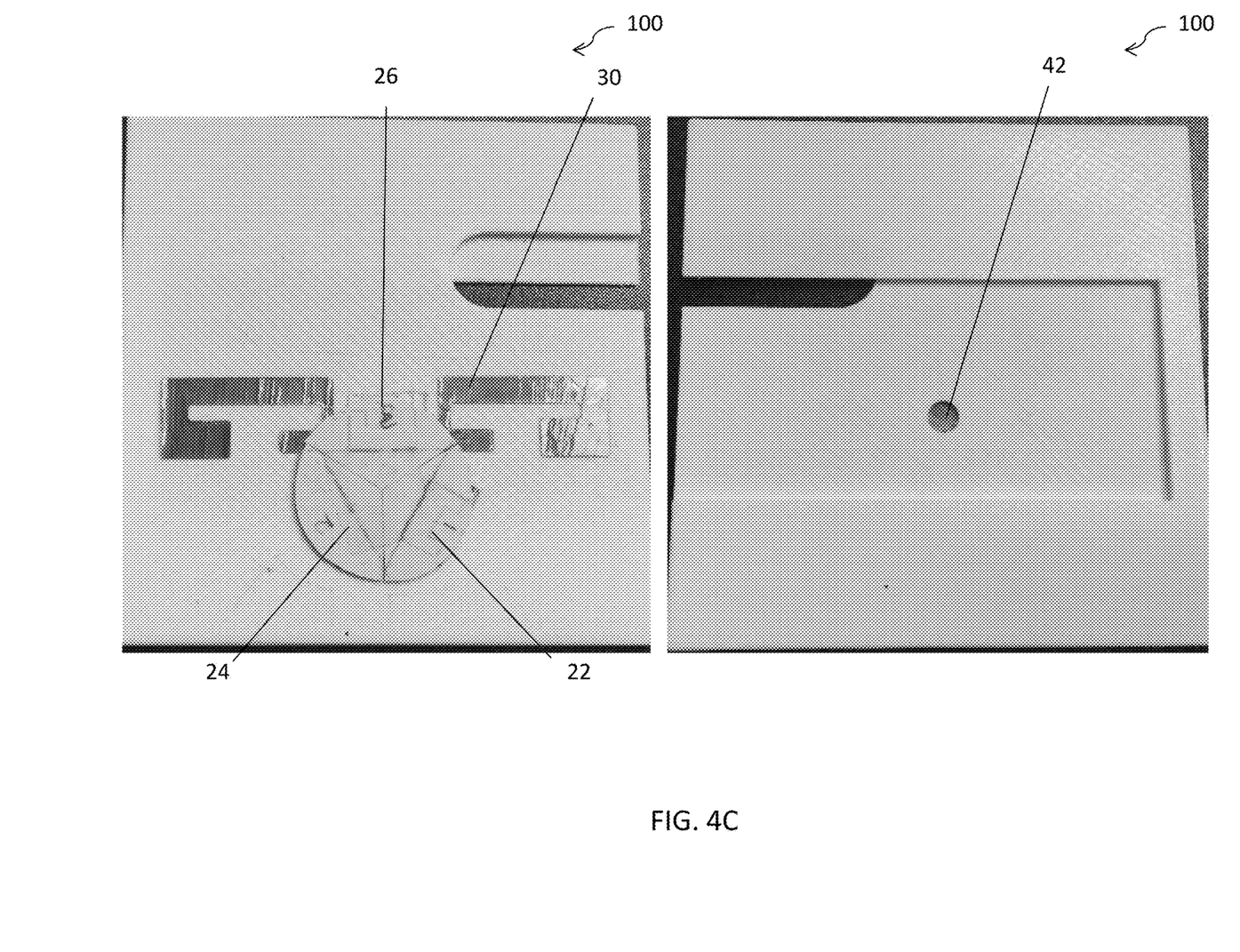
FIG. 4C shows a front and rear view of a switchable RFID tag with a third RFID code circuit in a communication position.

With reference to FIGS. 4A to 4C, there is provided a switchable RFID tag 100 comprising an adjustable member 20, an antenna 30 and a housing 40. Preferably, the adjustable member 20 may be a tag plate 20 with a plurality of RFID code circuits/loops with chips embedded therein, of which each of the three embedded portions 22, 24, 26 may be distinguished by visual indicators. For instance, each of the three portions 22, 24, 26 may be represented by three different colours such as black, blue and red. The tag plate 20 may be pivoted to the housing 40 through a coupling means 28.

Advantageously, the housing 40 may be further provided a window 42 on the rear surface, such that the user may observe the colour of the embedded portions 22/24/26 coupled to the antenna 30 through the window 42, thereby determining if the desired RFID embedded portion 22/24/26 has been inserted thereto.

In this embodiment, the first embedded portion 22 may be initially rotated into a communication position A and coupled to the antenna 30 through the antenna coupling 32, whilst the remaining embedded portions 24, 26 are substantially shielded by the shields 50a and 50b in an inactive position B. The user may observe a black indication through the window 42 initially, as shown in FIG. 4A.

The tag plate 20 may be manipulated by the user through an anti-clockwise direction, such that e.g. the first embedded portion 22 being in a communication position A can be rotated into an inactive position B, with an adjacent second embedded portion 24 being rotated from an inactive position B into a communication position A. The first embedded portion 22 is thus replaced by the second embedded portion 24 within the communication position A through a first rotation of the tag plate 20, such that the second embedded portion 24 is now coupled to the antenna 30 through the antenna coupling 32. The user may observe a blue indication through the window 42, as shown in FIG. 4B.

Preferably, the tag plate 20 may be further rotated anti-clockwise, such that the second embedded portion 24 being in a communication position A can be rotated into an inactive position B, with an adjacent third embedded portion 26 being rotated from an inactive position B into a communication position A. The second embedded portion 24 is thus replaced by the third embedded portion 26 within the communication position A through a second rotation of the tag plate 20, such that the third embedded portion 26 is now coupled to the antenna 30 through the antenna coupling 32. The user may observe a red indication through the window 42, as shown in FIG. 4C.

The tag plate 20 may be rotated anti-clockwise again by the user, such that the third embedded portion 26 being in a communication position A can be rotated into an inactive position B, with an adjacent first embedded portion 22 being rotated from an inactive position B into a communication position A. The third embedded portion 26 is thus replaced by the first embedded portion 22 within the communication position A through a third rotation of the tag plate 20, such that the first embedded portion 22 is now coupled to the antenna 30 again through the antenna coupling 32. The user may observe the black indication through the window 42 again, as shown in FIG. 4A.

Preferably, the switchable RFID tag 100 may deliver a rapid and effective switching between the three RFID code circuits 12, 14, 16 in FIGS. 3A to 3C, FIGS. 5A to 5B and the three embedded portions 22, 24, 26 in FIGS. 4A to 4C, for example, through some common mechanical means such as pre-defined stoppers, metal springs or the like. By rotating the tag plate 20 clockwise or anticlockwise, the desired code circuit 12/14/16 or desired embedded portion 22/24/26 may be coupled to the antenna 30 through the antenna coupling 32, and meanwhile, the code circuits 12/14/16 or embedded portions 22/24/26 to be deactivated may be removed from the antenna coupling 32. Advantageously, the false reading of undesired EPC by the reader during the interim of switching process may be avoided, while the present invention requires only a minimal amount of shielding pads comparing to linear switching mechanisms.

It will be appreciated by persons skilled in the art that although the embodiments comprising the switchable RFID tag 100 is applied in windshield tag for tolling, especially for switching between high-occupancy vehicle and single-occupancy vehicle by using UHF passive RFID electronic toll collection, these embodiments may also be applied in any other applications require switching of EPC mechanically for different status such as providing battery level information of devices e.g. robots by switching between fully charged, half-way charging and low battery level or the like with minor modifications and without departing from the concept of the present invention.

It will also be appreciated by person skilled in the art that these embodiments may also be applied in wide applications require switching of EPC manually for different output parameters such as providing postage information of parcels e.g. domestic or overseas, first class or second class delivery, or settling payments wirelessly with different accounts on the same credit card or electronic wallet associated with smartphones or smartphone cases, or alternatively providing a master key with different EPC codes for multi-access to different gates or doors within a restricted area such as residential area or recreational area.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A switchable RFID tag comprising:
   first, second, and third RFID code circuits disposed on an adjustable member being adjacent to an antenna; wherein the adjustable member is rotatable freely through 360° to move the first RFID code circuit into:
   a communication position, whereby the first RFID code circuit is coupled to the antenna, and the second and third RFID code circuits are in an inactive position uncoupled from the antenna, and
   the inactive position, whereby the first RFID code circuit is uncoupled from the antenna, and one of the second and third RFID code circuits is placed in the communication position; and
   wherein, when the first RFID code circuit is in the communication position, the adjustable member is rotatable in a first direction to move the first RFID code circuit to the inactive position, while simultaneously moving the second RFID code circuit to the communication position, and is rotatable in a second direction opposite from the first direction to move the first RFID code circuit to the inactive position, while simultaneously moving the third RFID code circuit to the communication position.

2. A switchable RFID tag in accordance with claim 1, wherein the adjustable member is a tag plate.

3. A switchable RFID tag in accordance with claim 2 further comprising at least one shield arranged to shield radio communications between the antennae and any of the first, second, and third RFID code circuits in the inactive position.

4. A switchable RFID tag in accordance with claim 3, wherein the tag plate is of circular arrangement the first, second, and third RFID code circuits are placed onto a portion of the tag plate between a rotational axis of the tag plate and an edge of the tag plate.

5. A switchable RFID tag in accordance with claim 4, wherein, in the communication position, the coupling between the antenna and the one of the first, second, and third RFID code circuits in the communication position is capacitive.

6. A switchable RFID tag in accordance with claim 5, wherein the antenna extends opposingly from the antenna coupling to substantially form a tangent with the circular arrangement.

7. A switchable RFID tag in accordance with claim 6, wherein the tag plate is arranged to be manipulated such that the one of the first, second, and third RFID code circuits being in the communication position can be rotated into the inactive position, with an adjacent one of the first, second, and third RFID code circuits being rotated from the inactive position into the communication position.

8. A switchable RFID tag in accordance with claim 1, further comprising a window arranged to partially reveal the one of the first, second, and third RFID code circuits or the adjustable member positioned at the communication position.

9. A switchable RFID tag in accordance with claim 8, wherein at least one of the first RFID code circuit, the second RFID code circuit, the third RFID code circuit, and the adjustable member is provided with a visual indicator.

10. A method for operating a switchable RFID circuit comprising the steps of:
rotating a tag plate having three RFID tags thereon between a communication position and an inactive position, wherein in the communication position, at least one of the three RFID tags is arranged to couple with an antenna for communication, whilst the remaining two RFID tags are shielded from the antenna; and
rotating the tag plate further through one of two opposite rotating directions so as to move the RFID tag being in the communication position to the inactive position and so as to simultaneously move one of the remaining two RFID tags into the communication position.

11. A method in accordance with claim 10, wherein the step of rotating the tag plate includes shielding the remaining RFID tags from radio communications by at least one shield.

12. A method in accordance with claim 11, wherein the at least one shield is positioned so as to shield the remaining RFID tags from radio communications when the remaining RFID tags are in the inactive position.

13. A method in accordance with claim 12, wherein the tag plate is of circular arrangement and the three RFID tags are placed onto a portion of the tag plate between a rotational axis of the circular arrangement and an edge of the tag plate.

14. A method in accordance with claim 13, wherein the communication position is when the portion of the tag plate with the at least one of the three RFID tags desired to be activated is rotated to an antenna coupling of the antenna, arranged to form a connection between the at least one of the three RFID tags on the portion of the tag plate and the antenna.

15. A method in accordance with claim 14, wherein the connection between the antenna and the at least one of the three RFID tags on the portion of the circular arrangement in the communication position is capacitive.

16. A method in accordance with claim 15, wherein the antenna extends opposingly from the antenna coupling to substantially form a tangent with the circular arrangement.

17. A method in accordance with claim 16, wherein each one of the three RFID tags is arranged to be rotated into a communication position whilst the remaining RFID tags are in an inactive position.

18. A method in accordance with claim 17, wherein the tag plate is arranged to be manipulated such that the RFID tag being in a communication position can be rotated into an inactive position, with an adjacent RFID tag being rotated from an inactive position into a communication position.

19. A method in accordance with claim 10, wherein the switchable RFID circuit further comprising a window arranged to partially reveal the at least one of the plurality of RFID tags or the tag plate positioned at the communication position.

20. A method in accordance with claim 19, wherein the at least one of the plurality of RFID tags or the tag plate is provided a visual indicator.

* * * * *